(12) United States Patent
Jensen et al.

(10) Patent No.: US 12,031,640 B2
(45) Date of Patent: Jul. 9, 2024

(54) METHODS AND APPARATUS FOR POWER SELECTION

(71) Applicant: FISHER CONTROLS INTERNATIONAL LLC, Marshalltown, IA (US)

(72) Inventors: Kurtis Jensen, Marshalltown, IA (US); William Sean Raymond, Toledo, IA (US); Eric Strong, Marshalltown, IA (US); Gregory W. Jacobs, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 722 days.

(21) Appl. No.: 17/184,091

(22) Filed: Feb. 24, 2021

(65) Prior Publication Data

US 2022/0268370 A1    Aug. 25, 2022

(51) Int. Cl.
*F16K 37/00*        (2006.01)
*F16K 31/42*        (2006.01)

(52) U.S. Cl.
CPC .......... *F16K 37/0083* (2013.01); *F16K 31/42* (2013.01)

(58) Field of Classification Search
CPC .............................. F16K 37/0083; F16K 31/42
See application file for complete search history.

(56) References Cited

U.S. PATENT DOCUMENTS

| | | | |
|---|---|---|---|
| 7,911,182 B2 | 3/2011 | Cargonja et al. | |
| 2008/0097652 A1* | 4/2008 | Koenig | F16K 37/0083 700/282 |
| 2014/0346882 A1* | 11/2014 | Emoto | H02M 7/02 307/65 |
| 2023/0304886 A1* | 9/2023 | Genta | G01M 3/2876 137/557 |

* cited by examiner

*Primary Examiner* — Lisa M Caputo
*Assistant Examiner* — Nyla Gavia
(74) *Attorney, Agent, or Firm* — Hanley, Flight & Zimmerman, LLC (57) ABSTRACT

Methods, apparatus, systems and articles of manufacture are disclosed for power selection, including evaluating a first power source to determine if the first power source is available, evaluating a second power source to determine if the second power source is available, upon determining that a power source of the first and second power sources is available, selecting the power source, providing power from the selected power source to a sensor, and performing the diagnostic task based on an input from the sensor.

15 Claims, 6 Drawing Sheets

METHODS AND APPARATUS FOR POWER SELECTION

FIELD OF THE DISCLOSURE

This disclosure relates generally to power sources and, more particularly, to methods and apparatus for power selection.

BACKGROUND

Industrial transmitters can measure and/or transmit a physical characteristic (position, speed, flow rate, pressure, temperature, etc.) associated with a device. The device can be a control valve on which the industrial transmitter is implemented to measure a position of a valve stem of the control valve. Measurements and/or diagnostics collected by the industrial transmitter can be sent to a control system for monitoring and controlling the control valve.

SUMMARY

An example method for performing a diagnostic task includes evaluating a first power source to determine if the first power source is available, evaluating a second power source to determine if the second power source is available, upon determining that a power source of the first and second power sources is available, selecting the power source, providing power from the selected power source to a sensor, and performing the diagnostic task based on an input from the sensor.

An example apparatus includes a power selection controller to evaluate a first power source to determine if the first power source is available, evaluate a second power source to determine if the second power source is available, upon determining that a power source of the first and second power sources is available, select the power source, a power output to provide power from the selected power source to a sensor, and a diagnostic controller to perform a diagnostic task based on an input from the sensor.

An example non-transitory computer readable medium includes instructions which, when executed, cause a machine to evaluate a first power source to determine if the first power source is available, upon determining that the first power source is not available, evaluate a second power source to determine if the second power source is available, upon determining that a power source of the first and second power sources is available, select the power source, provide power from the selected power source to a sensor, and perform a diagnostic task based on an input from the sensor.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Industrial transmitters (e.g., transmitters) can be implemented on a device to measure a value of one or more physical characteristics associated with the device. Such physical characteristics can include position, speed, pressure, flow rate, temperature, etc. Furthermore, the transmitter can be configured to transmit the measured values to a control system (e.g., a computer, a remote user device, etc.) coupled to the device. The measured values can be transmitted via an analog signal, a digital signal, and/or a pneumatic signal. The control system can use the measured values to control and/or monitor the device. In some applications, the transmitter (e.g., position transmitter) can be coupled to a valve (e.g., control valve) to measure a position of a valve stem of the valve. A control system coupled to the valve can determine whether the valve is open, closed, or partially open or closed based the measured position received from the transmitter.

The valve can additionally or alternatively be coupled to one or more limit switches, which typically include a mechanical switch. Such limit switches can be used to determine the position of the valve. In some cases, a first limit switch indicates that the valve is closed, and a second limit switch indicates that the valve is open. Mechanical limit switches typically require less wiring and fewer electrical components compared to industrial transmitters and, as such, have a reduced cost of installation. Typically, mechanical limit switches are incapable of collecting diagnostic information associated with the valve. Such diagnostic information can include a duration of time required to move the valve from open to closed, a duration of time required to move the valve from closed to open, a number of times the valve is opened, a number of times the valve is closed, a duration of time in the open position, a duration of time in the closed position, etc.

Examples disclosed herein can collect diagnostic information associated with a valve. Such diagnostic information can be used to monitor performance of the valve and determine whether the valve may require maintenance and/or replacement. In some cases, diagnostic information can be collected for multiple valves, where the performance between each of the valves may vary. In some cases, some of the valves may be operated (e.g., opened and/or closed) more frequently compared to other valves and, as such, may require more frequent and/or earlier maintenance compared to the other valves operated less frequently. Typically, the multiple valves are replaced at the same time on a timing-based maintenance schedule. As such, one or more of the valves may be replaced prematurely (e.g., prior to substantial wear and/or usage having occurred). Advantageously, examples disclosed herein allow an operator to identify, based on the diagnostic information, a subset of the valves having higher usage and/or wear. As such, examples disclosed herein can reduce maintenance costs associated with replacement of the valves by allowing an operator to identify and replace only those valves that require maintenance.

Examples disclosed herein can power an example diagnostic module by selecting between multiple power sources. In examples disclosed herein, the power sources can include at least one of a 4-20 milliampere (mA) signal or one or more limit switches coupled to one or more additional power sources. In examples disclosed herein, the diagnostic module can selectively switch between the power sources based on availability of each of the power sources. As such, examples disclosed herein can operate without including an additional and/or external power source to separately power the diagnostic module. Advantageously, the ability of examples disclosed herein to switch between the multiple power sources ensures that the diagnostic module can continue to operate in response to one or more of the power sources failing and/or becoming unavailable.

Figure 1:
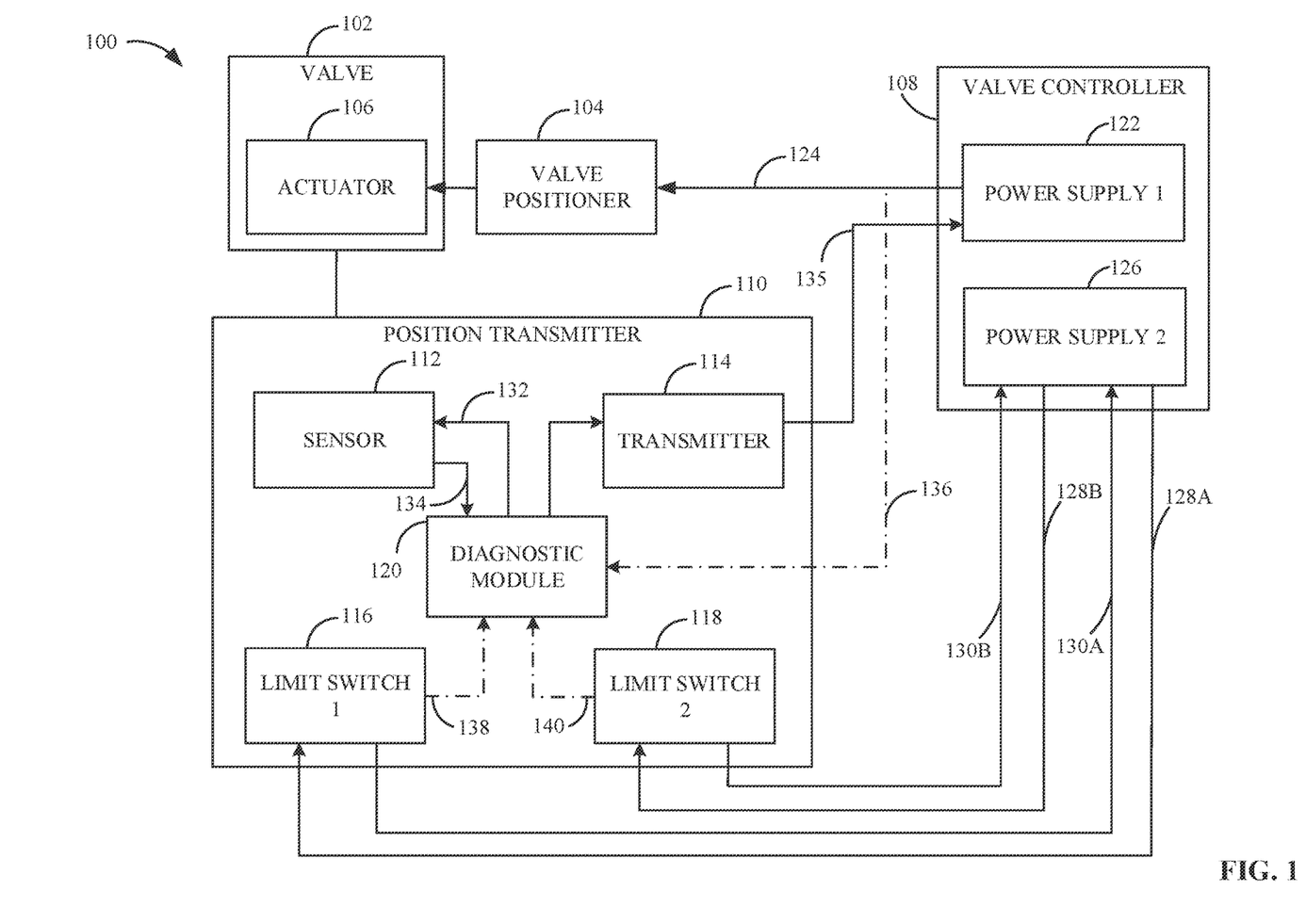
FIG. 1 illustrates an example system including an example valve, example limit switches, an example valve controller, and an example diagnostic module that can be constructed in accordance with the teachings of this disclosure.

FIG. 1 illustrates an example control system 100 including an example valve 102, an example valve positioner 104 operatively coupled to an example actuator 106 of the valve 102, an example valve controller 108, and an example position transmitter 110. The example position transmitter 110 includes an example sensor (e.g., hall effect sensor) 112 operatively coupled to the valve 102, an example transmitter 114, example limit switches 116, 118, and an example diagnostic module 120 that can be constructed in accordance with the teachings of this disclosure. The diagnostic module 120 is electrically and/or communicatively coupled to the sensor 112, the transmitter 114, and the limit switches 116, 118. In the illustrated example of FIG. 1, the valve controller 108 includes an example first power supply 122 configured to send an example continuous signal (e.g., 4-20 mA signal) 124 to the valve positioner 104, and an example second power supply 126 configured to power the limit switches 116, 118 via example power inputs 128A, 128B. Furthermore, the limit switches 116, 118 are configured to output example discrete signals 130A, 130B to the valve controller 108.

In the illustrated example of FIG. 1, the valve 102 is controllable via the continuous signal 124 to switch between an open position and a closed position. A position of the valve 102 is based on a value of the current of the continuous signal 124 sent by the valve controller 108. For example, the valve positioner 104 can switch the valve 102 to a closed position in response to the continuous signal 124 being a 4 mA signal, and the valve positioner 104 can switch the valve 102 to a fully open position in response to the continuous signal 124 being a 20 mA signal. In some examples, the valve 102 is partially open in response to the continuous signal 124 having a current value between 4 mA and 20 mA. In some examples, valve positioner 104 converts the current value of the continuous signal 124 to an air pressure on the actuator 106 of the valve 102. For example, the valve positioner 104 can increase the air pressure on the actuator 106 to fully open the valve 102 in response to the current value being 20 mA, and the valve positioner 104 can decrease the air pressure on the actuator 106 to fully close the valve 102 in response to the current value being 4 mA. In some examples, the valve 102 can be implemented on a fluid conduit to control the flow of a fluid from a first location to a second location. The example valve 102 can be a globe valve, a ball valve, a gate valve, a butterfly valve, or any other type of valve.

The valve controller 108 of FIG. 1 can control the position of the valve 102. For example, the valve controller 108 can control the current value of the continuous signal 124 sent to the valve positioner 104, where the current value corresponds to the desired position of the valve 102. In some examples, the valve controller 108 includes an interface that may be operated by an operator to control the current value of the continuous signal 124 and/or the position of the valve 102. In other examples, the valve controller 108 can be communicatively coupled to and/or configurable via a computer system (e.g., remote desktop) at a location different from a location of the valve 102 and/or the valve controller 108. In some examples, the valve controller 108 powers and/or generates the continuous signal 124 using the first power supply 122. In some examples, the first power supply 122 is a battery (e.g., 24V battery).

The position transmitter 110 is operatively coupled to the valve 102 to measure position and/or travel of the valve 102. In particular, the position transmitter 110 implements the diagnostic module 120 to gather, store, and/or transmit diagnostic information associated with the valve 102. For example, the diagnostic module 120 is communicatively coupled to the sensor 112, where the sensor 112 is configured to measure the position and/or speed associated with the valve 102 and/or the actuator 106. In some examples, the diagnostic module 120 can power the sensor 112 via an example first wired connection 132 and can receive measurement data from the sensor 112 via an example second wired connection 134. In such examples, the diagnostic module 120 can determine the diagnostic information based on the measurement data gathered by the sensor 112. In some examples, the diagnostic information can include at least one of (i) time required for the valve 102 to move from fully open to closed (e.g., an open-to-closed time), (ii) time required for the valve 102 to move from closed to fully open (e.g., a closed-to-open time), (iii) a number of times the valve 102 moved from fully open to closed, (iv) a number of times the valve 102 moved from closed to fully open, (v) how long the valve 102 was in the fully open position, and (vi) how long the valve 102 was in the closed position. In this example, the diagnostic module 120 is communicatively coupled to the transmitter 114 to transmit the diagnostic information to a computer system via the transmitter 114. In some examples, the diagnostic module 120 can be communicatively coupled to a display to display the diagnostic information to an operator. Furthermore, the transmitter 114 provides an example continuous feedback signal 135 as feedback to the first power supply 122 to indicate to the valve controller 108 the position of the valve 102. In some examples, a current value of the continuous feedback signal 135 corresponds to a position of the valve 102 (e.g., between fully open and closed).

In the illustrated example of FIG. 1, the limit switches 116, 118 are operatively coupled to the actuator 106 of the valve 102. In some examples, the limit switches 116, 118 are configured to indicate whether the valve 102 is at an extreme position (e.g., fully open and/or closed) based on the position of the actuator 106. Alternatively, the first limit switch 116 can be configured to indicate that the valve 102 is at a first position, and the second limit switch 118 can be configured to indicate that the valve 102 is at a second position, where the first position and the second position correspond to the valve 102 being partially open (e.g., between fully open and closed). For example, each of the limit switches 116, 118 includes a normally open circuit having a mechanical switch coupled to the actuator 106, where current does not flow through the circuit while the circuit is open. In the illustrated example of FIG. 1, the first limit switch 116 is configured to detect that the valve 102 is closed, and the second limit switch 118 is configured to detect that the valve 102 is fully open. As such, the first limit switch 116 is mechanically coupled to the actuator 106 so that, in response to the valve 102 moving to the closed position, the actuator 106 closes the circuit of the first limit switch 116. Similarly, the second limit switch 118 is mechanically coupled to the actuator 106 so that, in response to the valve 102 moving to the fully open position, the actuator 106 closes the circuit of the second limit switch 118.

In response to the first limit switch 116 and/or the second limit switch 118 being closed, current can flow through the first limit switch 116 to conduct the first discrete signal 130A and/or through the second limit switch 118 to conduct the second discrete signal 130B to the valve controller 108. In such examples, the first discrete signal 130A can indicate to the valve controller 108 that the valve 102 is closed, and the second discrete signal 130B can indicate to the valve controller 108 that the valve 102 is fully open. Alternatively, in response to the first limit switch and/or the second limit switch 118 being open, voltage potential is available across the second power supply 126. In some examples, the first limit switch 116 and/or the second limit switch 118 can be coupled to one or more voltage sources different from the second power supply 126. In some such examples, the first limit switch 116 can be electrically coupled to and/or receive power from a first voltage source, and the second limit switch 118 can be electrically coupled to and/or receive power from a second voltage source independent of the first voltage source.

In the illustrated example of FIG. 1, the diagnostic module 120 does not include a power supply. As such, the diagnostic module 120 is configured to scavenge and/or draw power from one or more power sources in the control system 100 based on availability of each of the one or more power sources. In some examples, an example first power source 136 can be provided by the continuous signal 124, an example second power source 138 can be an output of the first limit switch 116, and an example third power source 140 can be an output of the second limit switch 118. In some examples, additional power sources (e.g., a fourth power source, a fifth power source, etc.) may be used. In some examples, the diagnostic module 120 selects an active power source from among the first power source 136, the second power source 138, and the third power source 140 based on a predetermined sequence and/or an availability of each of the power sources. For example, the diagnostic module 120 can be configured to draw power from the first power source 136 in response to determining that the first power source 136 is available. In such examples, in response to determining that the first power source 136 is not available, the diagnostic module 120 can be configured to draw power from the second power source 138. Additionally, in response to determining that the second power source 138 is not available, the diagnostic module 120 can be configured to draw power from the third power source 140.

In some examples, the first power source 136 (e.g., the continuous signal 124) may become unavailable in response to a wired connection between the valve controller 108 and the diagnostic module 120 becoming disconnected and/or otherwise failing. Additionally or alternatively, the first power source 136 may become unavailable in response to a software failure in the valve controller 108 causing a current of the continuous signal 124 to drop (e.g., to 0 mA). In some examples, the second power source 138 is available in response to the first limit switch 116 being closed, and the second power source 138 is unavailable in response to the first limit switch 116 being opened. Similarly, in some examples, the third power source 140 is available in response to the second limit switch 118 being closed, and the third power source 140 is unavailable in response to the second limit switch 118 being opened. In some examples, the second power source 138 and/or the third power source 140 may be unavailable in response to damage to the second power supply 126 and/or to an input/output card of the valve controller 108, resulting in disruption of power output from the second power supply 126.

Figure 2:
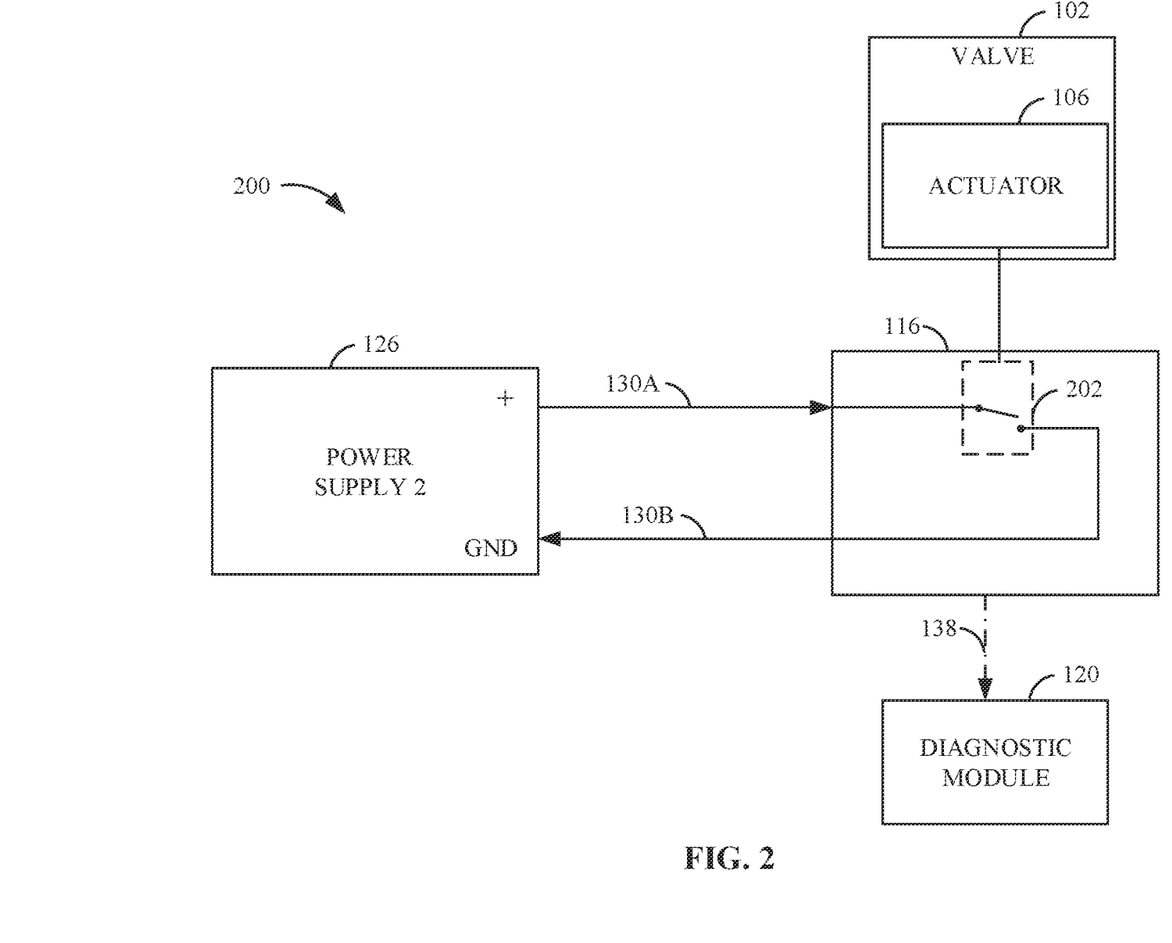
FIG. 2 illustrates an example mechanical limit switch that can be implemented in connection with the limit switches of FIG. 1.

FIG. 2 illustrates an example circuit 200 (e.g., normally open circuit) that may be implemented by the example limit switches 116, 118 of FIG. 1. In the illustrated example of FIG. 2, the circuit 200 is described in connection with the first limit switch 116. However, the circuit 200 can similarly be implemented in connection with the second limit switch 118. In the illustrated example of FIG. 2, the circuit 200 includes an example mechanical switch 202 operatively coupled to the actuator 106 of FIG. 1. In some examples, the mechanical switch 202 is normally open when the actuator 106 is not engaging and/or having contact with the mechanical switch 202. As such, current does not flow through the circuit 200 when the mechanical switch 202 is open. As a result, an input voltage and/or current is not conveyed to the diagnostic module 120 or to the valve controller 108. Instead, a voltage potential is available across the circuit 200 when the mechanical switch 202 is open.

In this example, the actuator 106 can close the mechanical switch 202 to allow current to flow through the circuit 200. For example, the first limit switch 116 is configured so that, when the valve 102 is in the closed position, the actuator 106 engages the mechanical switch 204 to close the circuit 200. When the circuit 200 is closed, current from a positive terminal of the second power supply 126 is conveyed to the first limit switch 116 as the first discrete signal 130A, and from the first limit switch 116 to a ground terminal of the second power supply 126 as the second discrete signal 130B. In some examples, the second discrete signal 130B at the second power supply 126 can indicate to the valve controller 108 that the valve 102 is in the closed position. Furthermore, when the circuit 200 is closed, the diagnostic module 120 can scavenge power from the first limit switch 116 to power one or more operations of the diagnostic module 120. For example, some of the current flowing between the positive terminal and the ground terminal of the second power supply 126 can flow to the diagnostic module 120. In such an example, the current at the diagnostic module 120 from the first limit switch 116 can indicate to the diagnostic module 120 that the valve 102 is in the closed position.

Figure 3:
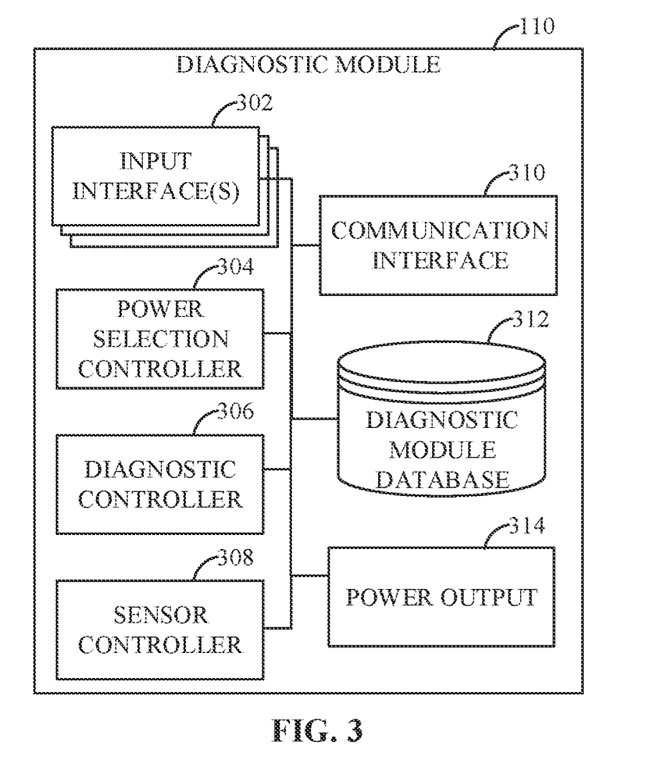
FIG. 3 is a block diagram of the example diagnostic module of FIG. 1 including an example diagnostic controller.

FIG. 3 is a block diagram of the example diagnostic module 120 of FIG. 1 configured to collect, store, and transmit diagnostic information associated with the valve 102 of FIG. 1. In the illustrated example of FIG. 3, the diagnostic module 120 includes one or more example input interfaces 302, an example power selection controller 304, an example diagnostic controller 306, an example sensor controller 308, an example communication interface 310, an example diagnostic module database 312, and an example power output 314.

In the illustrated example of FIG. 3, the input interfaces 302 are configured to receive input from a user (e.g., operator) of the diagnostic module 120 and/or, more generally, the control system 100 of FIG. 1. In some examples, the input interfaces 302 are configured to receive instructions from the user via a computer system communicatively coupled to the input interfaces 302. In such examples, the computer system may be coupled to the input interface 302 via a wireless connection or a wired connection. In some examples, the input interfaces 302 can be coupled to one or more physical actuators (e.g., a knob, a button, a lever, a dial, etc.) coupled to the diagnostic module 120. In some such examples, the user can control one or more characteristics associated with the control system 100 in response to operating the one or more physical actuators.

In the illustrated example of FIG. 3, the power selection controller 304 selects an active power source to power the diagnostic module 120. For example, the power selection controller 304 selects between the first power source 136 (e.g., from the continuous signal 124 of FIG. 1), the second power source 138 (e.g., from the first limit switch 116 of FIG. 1), and the third power source 140 (e.g., from the second limit switch 118 of FIG. 1) based on a predetermined sequence and/or based on an availability of each power source. In some examples, the power selection controller 304 is configured to select and/or draw power from the first power source 136 in response to determining that the first power source 136 is available. Alternatively, in response to the power selection controller 304 determining that the first power source 136 is not available, the power selection controller 304 is configured to select and/or draw power from the second power source 138. Additionally, in response to the power selection controller 304 determining that the second power source 138 is not available, the power selection controller 304 is configured to select and/or draw power from the third power source 140. In some examples, one or more additional power sources are available. In such examples, the power selection controller 304 is configured to select between the one or more additional power sources when the first power source 136, the second power source 138, and the third power source 140 are unavailable.

In some examples, the power selection controller 304 can determine that the first power source 136, the second power source 138, and/or the third power source 140 is available in response to a current from the selected power source satisfying a threshold (e.g., a current threshold). For example, the power selection controller 304 measures a first current from the first power source 136, a second current from the second power source 138, and a third current from the third power source 140. In some examples, the power selection controller 304 determines that the first power source 136 is available in response to the first current exceeding a first current threshold. Similarly, the power selection controller 304 determines that the second power source 138 is available in response to the second current exceeding a second current threshold. Additionally, the power selection controller 304 determines that the third power source 140 is available in response to the third current exceeding a third current threshold. In some examples, the first current threshold, the second current threshold, and the third current threshold can be the same threshold or can be different thresholds. In some examples, the second current threshold and the third current threshold are at 1 mA. In some such examples, the power selection controller 304 draws less than 1 mA of current from the second power source 138 and/or the third power source 140.

In the illustrated example of FIG. 3, the diagnostic controller 306 gathers and/or analyzes diagnostic information associated with the valve 102. For example, in response to receiving measurements collected by the sensor 112 of FIG. 1, the diagnostic controller 306 determines and/or counts one or more diagnostic parameters associated with performance of the valve 102. The diagnostic parameters can include at least one of a time required to open and/or close the valve 102, a number of times the valve 102 has been opened and/or closed, or a duration of time the valve 102 has been opened and/or closed. Calculation of the diagnostic parameters by the diagnostic controller 306 is further described below in connection with FIG. 4.

In the illustrated example of FIG. 3, the sensor controller 308 controls the sensor 112 of FIG. 1. For example, the sensor controller 308 is communicatively coupled to the sensor 112 to receive one or more signals from the sensor 112. In some examples, the sensor controller 308 can determine that the valve 102 is opened or closed based on the one or more signals. In some examples, the sensor controller 308 can determine a position and/or a speed associated with the valve 102 and/or the actuator 106 based on the one or more signals. In some examples, the sensor controller 308 can send sensor data based on the one or more signals to the diagnostic controller 306 for processing of the sensor data. Furthermore, the example sensor controller 308 can be configured to calibrate and/or recalibrate the sensor 112 in response to a command from the user via the input interface 302.

In the illustrated example of FIG. 3, the communication interface 310 is configured to communicate with one or more external computer systems. For example, the communication interface 310 can send a report generated by the diagnostic controller 306 to the one or more external computer systems, where the report includes diagnostic information determined by the diagnostic controller 306. In some examples, the communication interface 310 can send sensor data to the one or more external computer systems, where the sensor data is raw data (e.g., not processed by the diagnostic controller 306). In some examples, the communication interface 310 can be configured to send the report periodically, or in response to a command from a user. In such examples, the communication interface 310 can be configured to receive instructions and/or commands from the user via a wireless signal. In some examples, the communication interface 310 can be configured to send and/or receive the sensor data and/or the diagnostic information via a transmitter (e.g., a radio-frequency transmitter). Additionally or alternatively, the communication interface 310 can display the sensor data and/or the diagnostic information to the user via a user interface. In some examples, the transmitter and/or the user interface can be powered by the first power source 136, the second power source 138, and/or the third power source 140 selected by the power selection controller 304.

In the illustrated example of FIG. 3, the diagnostic module database 312 stores diagnostic information generated by the diagnostic controller 306. In some examples, the diagnostic module database 312 can store sensor data from the sensor 112 that has not been processed by the diagnostic controller 306. The example diagnostic module database 312 of FIG. 3 is implemented by any memory, storage device and/or storage disc for storing data such as, for example, flash memory, magnetic media, optical media, solid state memory, hard drive(s), thumb drive(s), etc. Furthermore, the data stored in the example diagnostic module database 312 may be in any data format such as, for example, binary data, comma delimited data, tab delimited data, structured query language (SQL) structures, etc. While, in the illustrated example, the example diagnostic module database 312 is illustrated as a single device, the example diagnostic module database 312 and/or any other data storage devices described herein may be implemented by any number and/or type(s) of memories.

In the illustrated example of FIG. 3, the power output 314 provides power to the sensor 112. For example, the power output 314 directs power to the sensor 112 from at least one of the first power source 136, the second power source 138, or the third power source 140 based on the power source selected by the power selection controller 304. In some examples, the power output 314 can be configured to output power to one or more additional components (e.g., a second sensor) couplable to the diagnostic module 120. Additionally or alternatively, the sensor 112 can be powered by a separate power source (e.g., a battery) coupled to the sensor 112.

Figure 4:
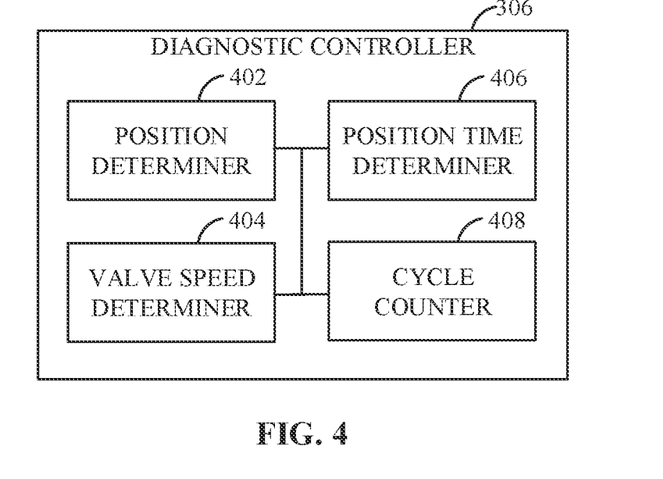
FIG. 4 is a block diagram of the example diagnostic controller of FIG. 3.

FIG. 4 illustrates the example diagnostic controller 306 of FIG. 3 implemented by the diagnostic module 120 of FIGS. 1, 2, and/or 3. The example diagnostic controller 306 is configured to gather and/or analyze diagnostic information associated with the valve 102 of FIG. 1 based on sensor data collected by the sensor 112 of FIG. 1. In the illustrated example of FIG. 4, the example diagnostic controller 306 includes an example position determiner 402, an example valve speed determiner 404, an example position time determiner 406, and an example cycle counter 408.

In the illustrated example of FIG. 4, the position determiner 402 determines a position of the valve 102 and/or the actuator 106 of FIG. 1 based on sensor data from the sensor 112 of FIG. 1. For example, the position determiner 402 can determine that the valve 102 is open based on a first signal from the sensor 112, and the position determiner 402 can determine that the valve 102 is closed based on a second signal from the sensor 112. In some examples, the position determiner 402 can determine that the valve 102 is at a position between fully open and closed based on one or more third signals from the sensor 112. In some examples, the position determiner 402 can report the determined position of the valve 102 to the example valve speed determiner 404, the example position time determiner 406, and/or the example cycle counter 408. Additionally or alternatively, the position determiner 402 can direct the diagnostic module database 312 of FIG. 3 to store the determined position and the time at which the position was determined. In some examples, the sensor 112 includes at least one of a hall-effect sensor and magnet, or a potentiometer for determining the position of the valve 102.

In the illustrated example of FIG. 4, the valve speed determiner 404 is configured to determine a speed of the valve 102 and/or the actuator 106. For example, the valve speed determiner 404 receives determined positions of the valve 102 and times corresponding to each of the determined positions from the position determiner 402. In such examples, based on the determined positions and the corresponding times, the valve speed determiner 404 determines the speed at which the valve 102 moves between the open and closed positions. Additionally or alternatively, the valve speed determiner 404 determines the speed of the valve 102 based on a speed measurement obtained by the sensor 112. In some examples, based on the determined positions and the times, the valve speed determiner 404 determines a time required for the valve 102 to move from the fully open position to the closed position (e.g., an open-to-closed time). Additionally or alternatively, based on the determined positions and times, the valve speed determiner 404 determines a time required for the valve 102 to move from the closed position to the open position (e.g., a closed-to-open time). In some such examples, the valve speed determiner 404 can store the determined times required to open and/or close the valve 102 in the diagnostic module database 312.

In the illustrated example of FIG. 4, the position time determiner 406 determines a duration of time that the valve 102 is at a given position. For example, the position time determiner 406 receives the determined positions of the valve 102 and the times corresponding to each of the determined positions from the position determiner 402. In such examples, based on the determined positions and the times, the position time determiner 406 determines the duration of time the valve 102 was last in the fully open position, and/or the duration of time the valve 102 was last in the closed position. Additionally or alternatively, the position time determiner 406, based on the determined positions and times, determines a total duration of time the valve 102 was in the fully open position, and/or a total duration of time the valve 102 was in the closed position. In some such examples, the position time determiner 406 can store the durations of time and/or the total durations of time in the diagnostic module database 312.

In the illustrated example of FIG. 4, the cycle counter 408 determines a number of times (e.g., cycles) the valve 102 moves between the fully open position and the closed position. In such examples, a cycle refers to the valve 102 moving from the fully open position to the closed position, or from the closed position to the fully open position. For example, the cycle counter 408 receives the determined positions of the valve 102 and the times corresponding to each of the determined positions from the position determiner 402. In such examples, based on the determined positions and the times, the cycle counter 408 determines the number of times the valve 102 moves from the fully open position to the closed position, and/or the number of times the valve 102 moves from the closed position to the fully open position. In some examples, the cycle counter 408 can store the determined number of cycles in the diagnostic module database 312.

In the illustrated example of FIG. 4, the information determined by the position determiner 402, the valve speed determiner 404, the position time determiner 406, and/or the cycle counter 408 corresponds to the diagnostic information associated with the valve 102. Additionally or alternatively, the diagnostic information can include other measured and/or determined characteristics associated with the valve 102. For example, the diagnostic information can include a length of time the valve 102 is in a current position, a length of time the valve 102 was in a previous position, time required to open and/or close the valve 102, and/or ambient temperature proximate the valve 102. In some examples, the diagnostic information can be stored in the diagnostic module database 312 and/or reported to a user via a report generated by the communication interface 310.

In examples disclosed herein, the example diagnostic module 120 and/or the example diagnostic controller 306 is/are implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc.

While an example manner of implementing the diagnostic module 120 of FIG. 1 is illustrated in FIGS. 3 and/or 4, one or more of the elements, processes and/or devices illustrated in FIGS. 3 and/or 4 may be combined, divided, re-arranged, omitted, eliminated and/or implemented in any other way. Further, the example input interfaces 302, the example power selection controller 304, the example diagnostic controller 306, the example sensor controller 308, the example communication interface 310, the example diagnostic module database 312, the example power output 314, the example position determiner 402, the example valve speed determiner 404, the example position time determiner 406, the example cycle counter 408 and/or, more generally, the example diagnostic module 120 of FIG. 1 may be implemented by hardware, software, firmware and/or any combination of hardware, software and/or firmware. Thus, for example, any of the example input interfaces 302, the example power selection controller 304, the example diagnostic controller 306, the example sensor controller 308, the example communication interface 310, the example diagnostic module database 312, the example power output 314, the example position determiner 402, the example valve speed determiner 404, the example position time determiner 406, the example cycle counter 408 and/or, more generally, the example diagnostic module 120 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input interfaces 302, the example power selection controller 304, the example diagnostic controller 306, the example sensor controller 308, the example communication interface 310, the example diagnostic module database 312, the example power output 314, the example position determiner 402, the example valve speed determiner 404, the example position time determiner 406, or the example cycle counter 408 is/are hereby expressly defined to include a non-transitory computer readable storage device or storage disk such as a memory, a digital versatile disk (DVD), a compact disk (CD), a Blu-ray disk, etc. including the software and/or firmware. Further still, the example diagnostic module 120 of FIG. 1 may include one or more elements, processes and/or devices in addition to, or instead of, those illustrated in FIGS. 3 and/or 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
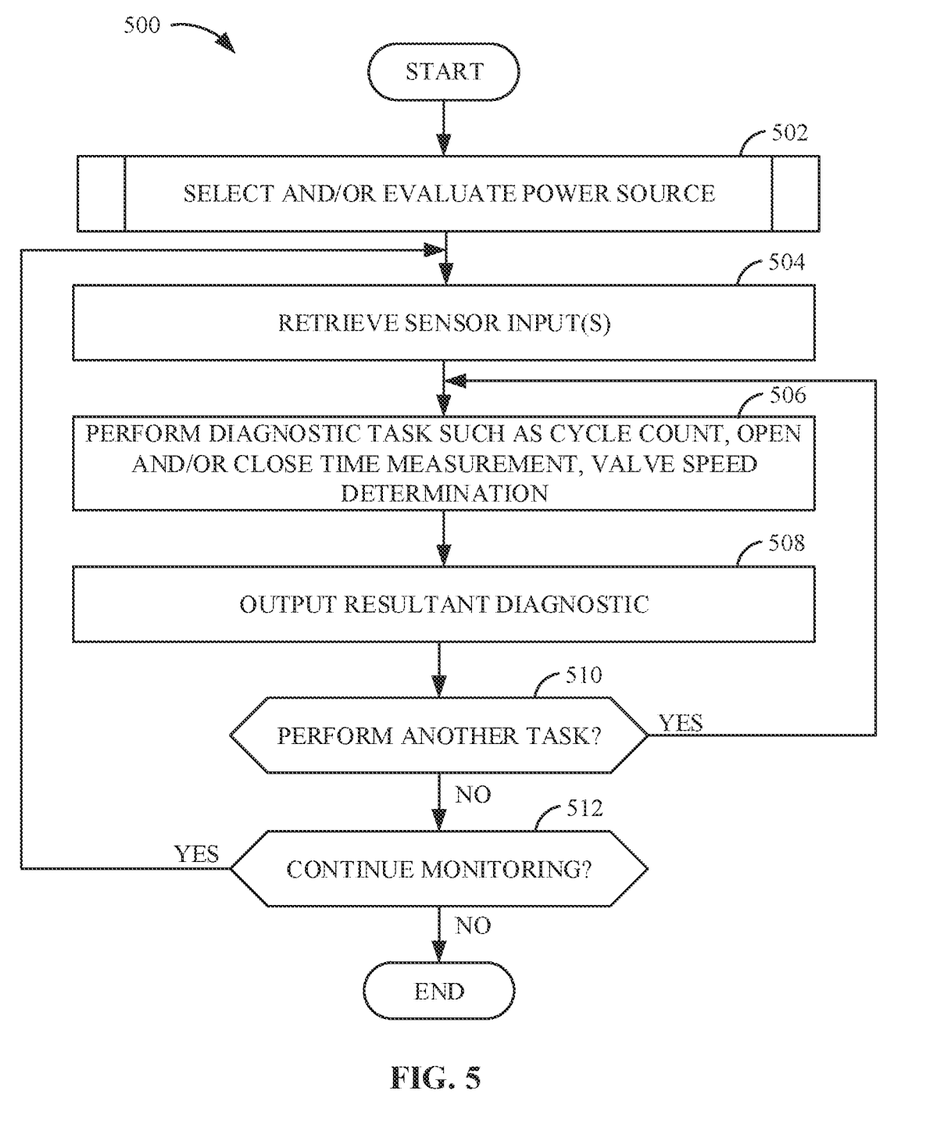
FIG. 5 is a flowchart representative of machine readable instructions which may be executed to implement the example diagnostic module of FIGS. 1 and/or 3 and the example diagnostic controller of FIGS. 3 and/or 4 to select a power source and perform a diagnostic task.
Figure 6:
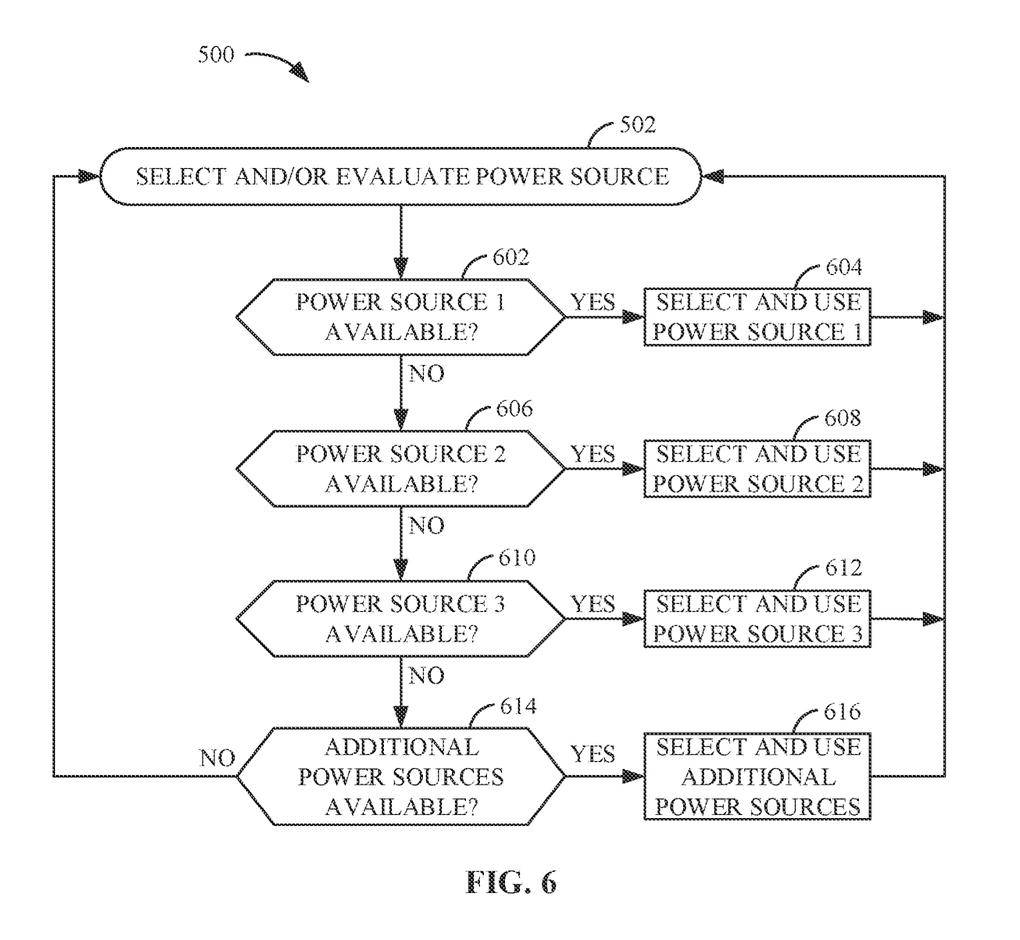
FIG. 6 is a flowchart representative of machine readable instructions which may be executed to implement the example diagnostic module of FIGS. 1 and/or 3 to select a power source.

Flowcharts representative of example hardware logic, machine readable instructions, hardware implemented state machines, and/or any combination thereof for implementing the diagnostic module 120 of FIG. 1 are shown in FIGS. 5 and/or 6. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example programs are described with reference to the flowcharts illustrated in FIGS. 5 and/or 6, many other methods of implementing the example diagnostic module 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part.

Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5 and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart representative of machine readable instructions 500 which may be executed to implement the example diagnostic module 120 of FIGS. 1, 2, and/or 3 and the example diagnostic controller 306 of FIGS. 3 and/or 4 to select a power source and perform a diagnostic task. In FIG. 5, the instructions begin as the diagnostic module 120 is coupled to the valve 102, the first limit switch 116, the second limit switch 118, and the valve controller 108 of FIG. 1.

At block 502, the example diagnostic module 120 selects and/or evaluates a power source as described below in connection with FIG. 6. For example, the example power selection controller 304 selects a power source from the first power source 136, the second power source 138, and the third power source 140 corresponding to the valve controller 108, the first limit switch 116, and the second limit switch 118, respectively.

At block 504, the example diagnostic module 120 retrieves one or more sensor inputs. For example, the example sensor controller 308 of FIG. 3 obtains one or more signals from the sensor 112 of FIG. 1. In some examples, the example sensor controller 308 determines sensor data based on the one or more signals, where the sensor data includes at least one of positions of the valve 102 and times corresponding to the positions.

At block 506, the example diagnostic module 120 performs a diagnostic task including at least one of determining a cycle count, an open and/or close time, or a valve speed. For example, in response to the diagnostic task including determining a cycle count, the example cycle counter 408 of FIG. 4 determines a number of times the valve 102 has opened and/or closed based on the sensor data from the sensor controller 308. In some examples, in response to the diagnostic task including determining an open and/or close time, the example position time determiner 406 of FIG. 4 determines a duration of time the valve 102 has been in the open position and/or the closed position. In some examples, in response to the diagnostic task including determining a valve speed, the example valve speed determiner 404 of FIG. 4 determines a time required to move the valve 102 between the open position and the closed position. In other examples, other diagnostic information may be determined by the diagnostic module 120.

At block 508, the example diagnostic module 120 outputs a resultant diagnostic information determined at block 506. For example, the example communication interface 310 generates a report including the diagnostic information determined at block 506, where the diagnostic information includes at least one of the cycle count, the open and/or close time measurement, or the valve speed associated with the valve 102. In some such examples, the communication interface 310 outputs the resultant diagnostic information to a user via one or more external computer systems communicatively coupled to the diagnostic module 120.

At block 510, the example diagnostic module 120 determines whether to perform another diagnostic task. For example, in response to the diagnostic controller 306 determining that another diagnostic task is to be performed (e.g., block 510 returns a result of YES), control proceeds to block 512. Alternatively, in response to the diagnostic controller 306 determining that another diagnostic task is not to be performed (e.g., block 510 returns a result of NO), control returns to block 506.

At block 512, the diagnostic module 120 determines whether to continue monitoring. For example, in response to the sensor controller 308 determining that more sensor data is to be received from the sensor 112 (e.g., block 512 returns a result of YES), control returns to block 504. Alternatively, in response to the sensor controller 308 determining that no more sensor data is to be received from the sensor 112 (e.g., block 512 returns a result of NO), control ends.

FIG. 6 is a flowchart representative of machine readable instructions 600 which may be executed to implement the example diagnostic module 120 of FIGS. 1, 2, and/or 3 to select a power source in connection with block 502 of FIG. 5. The example instructions 600 begin as the example power selection controller 304 of FIG. 3 is to select and/or evaluate an available power source from among one or more power sources.

At block 602, the diagnostic module 120 determines whether a first power source 136 is available. In some examples, the first power source 136 is the example valve controller 108 and/or the example continuous signal 124 of FIG. 1. For example, the power selection controller 304 determines that the first power source 136 is available in response to determining that the valve controller 108 and/or the example continuous signal 124 is wired and/or connected to the diagnostic module 120 and available to supply power to the diagnostic module 120. In some examples, the power selection controller 304 determines that the first power source 136 is not available in response to the connection between the diagnostic module 120 and the valve controller 108 failing and/or becoming disconnected. For example, in response to the power selection controller 304 determining that the first power source 136 is available (e.g., block 602 returns a result of YES), control proceeds to block 604. Alternatively, in response to the power selection controller 304 determining that the first power source 136 is not available (e.g., block 602 returns a result of NO), control proceeds to block 606.

At block 604, the example diagnostic module 120 selects and uses the first power source 136. For example, the power selection controller 304 selects the first power source 136 (e.g., from the valve controller 108) to power the diagnostic module 120.

At block 606, the diagnostic module 120 determines whether a second power source 138 is available. In some examples, the second power source 138 is the example first limit switch 116 of FIG. 1. For example, the power selection controller 304 determines that the second power source 138 is available in response to determining that the first limit switch 116 is wired and/or connected to the diagnostic module 120 and available to supply power to the diagnostic module 120. For example, in response to the power selection controller 304 determining that the second power source 138 is available (e.g., block 606 returns a result of YES), control proceeds to block 608. Alternatively, in response to the power selection controller 304 determining that the second power source 138 is not available (e.g., block 606 returns a result of NO), control proceeds to block 610.

At block 608, the example diagnostic module 120 selects and uses the second power source 138. For example, the power selection controller 304 selects the second power source 138 (e.g., from the first limit switch 116) to power the diagnostic module 120.

At block 610, the diagnostic module 120 determines whether a third power source 140 is available. In some examples, the third power source 140 is the example second limit switch 118 of FIG. 1. For example, the power selection controller 304 determines that the third power source 140 is available in response to determining that the second limit switch 118 is wired and/or connected to the diagnostic module 120 and available to supply power to the diagnostic module 120. For example, in response to the power selection controller 304 determining that the third power source 140 is available (e.g., block 610 returns a result of YES), control proceeds to block 612. Alternatively, in response to the power selection controller 304 determining that the third power source 140 is not available (e.g., block 610 returns a result of NO), control proceeds to block 614.

At block 612, the example diagnostic module 120 selects and uses the third power source 140. For example, the power selection controller 304 selects the third power source 140 (e.g., from the second limit switch 118) to power the diagnostic module 120.

At block 614, the diagnostic module 120 determines whether one or more additional power sources are available. In some examples, the additional power sources may include a battery. For example, in response to the power selection controller 304 determining that at least one of the additional power sources is available (e.g., block 614 returns a result of YES), control proceeds to block 616. Alternatively, in response to the power selection controller 304 determining that the additional power sources are not available (e.g., block 614 returns a result of NO), control returns to block 502.

At block 616, the example diagnostic module 120 selects and uses the at least one of the additional power sources. For example, the power selection controller 304 selects the at least one of the additional power sources (e.g., the battery) to power the diagnostic module 120. Control returns to block 502.

Figure 7:
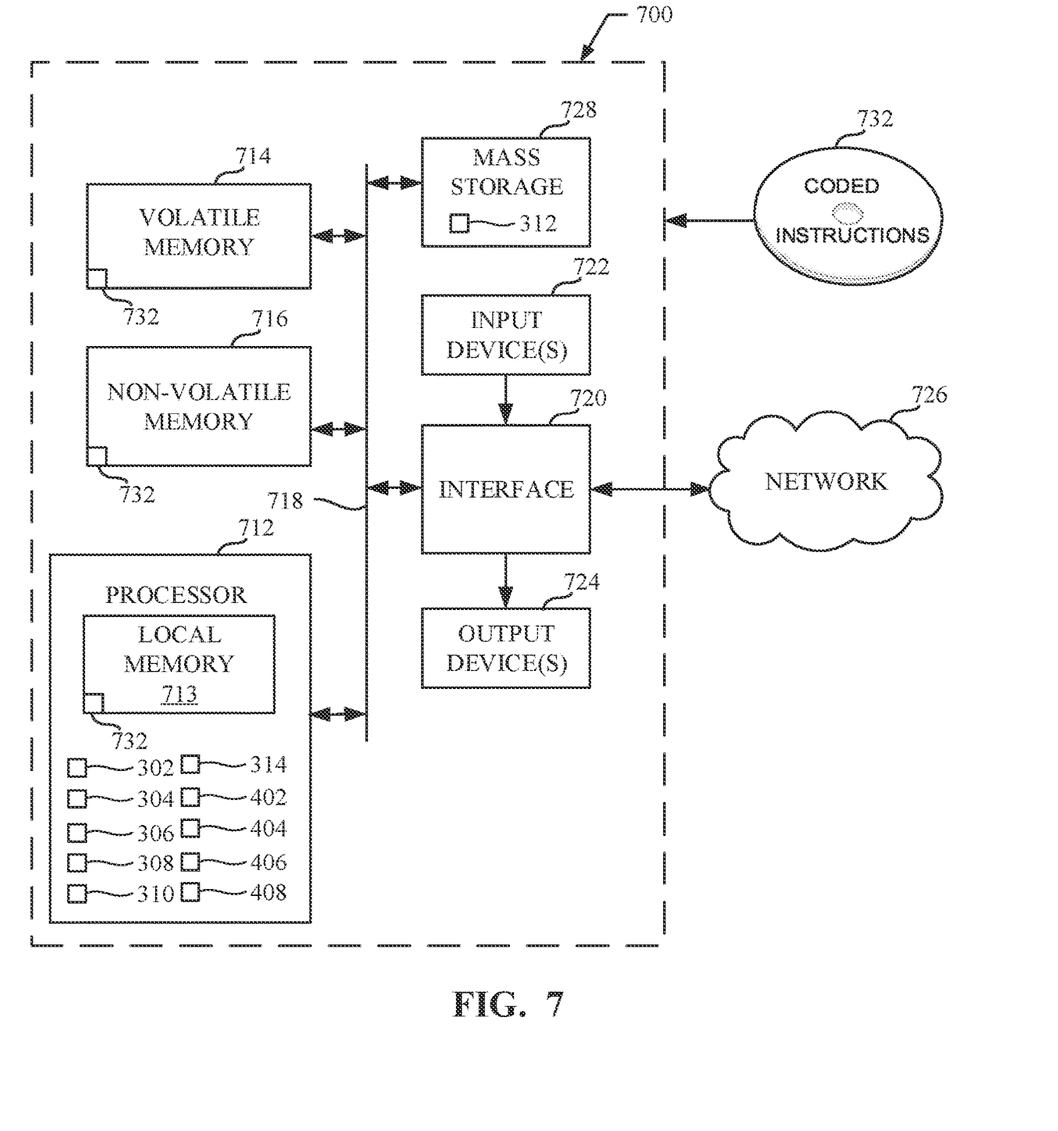
FIG. 7 is a block diagram of an example processing platform structured to execute the instructions of FIGS. 5 and/or 6 to implement the example diagnostic module of FIGS. 1 and/or 3 and/or the example diagnostic controller of FIGS. 3 and/or 4.

FIG. 7 is a block diagram of an example processor platform 700 structured to execute the instructions of FIGS. 5 and/or 6 to implement the diagnostic module 120 of FIG. 3. The processor platform 700 can be, for example, a server, a personal computer, a workstation, a self-learning machine (e.g., a neural network), a mobile device (e.g., a cell phone, a smart phone, a tablet such as an iPad™), or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 implements the example input interfaces 302, the example power selection controller 304, the example diagnostic controller 306, the example sensor controller 308, the example communication interface 310, the example diagnostic module database 312, the example power output 314, the example position determiner 402, the example valve speed determiner 404, the example position time determiner 406, and the example cycle counter 408.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 5 and/or 6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that select a power source to perform one or more diagnostic tasks. The disclosed methods, apparatus and articles of manufacture improve the efficiency of using a computing device by selecting between one or more existing power sources based one availability of each of the power sources, enabling the computing device to continually (e.g., without interruption) perform diagnostic tasks associated with a valve. The disclosed methods, apparatus and articles of manufacture can be implemented on existing valve control systems to use the existing power sources of the valve control systems, thereby eliminating the need to implement a separate power source to power a diagnostic module. The disclosed methods, apparatus and articles of manufacture are accordingly directed to one or more improvement(s) in the functioning of a computer.

Example methods, apparatus, systems, and articles of manufacture to select a power source to perform one or more diagnostic tasks are disclosed herein. Further examples and combinations thereof include the following:

Example 1 includes a method for performing a diagnostic task. The method of Example 1 includes evaluating a first power source to determine if the first power source is available, evaluating a second power source to determine if the second power source is available, upon determining that a power source of the first and second power sources is available, selecting the power source, providing power from the selected power source to a sensor, and performing the diagnostic task based on an input from the sensor.

Example 2 includes the method of Example 1, where at least one of the first and second power sources is a 4-20 milliamp signal for a valve.

Example 3 includes the method of Example 1, where at least one of the first and second power sources is an output of a limit switch.

Example 4 includes the method of Example 1, where evaluating the first and second power sources includes determining if the power source of the first and second power sources exceeds a current threshold.

Example 5 includes the method of Example 1, where the sensor is to determine a position of a valve.

Example 6 includes the method of Example 5, where performing the diagnostic task based on the input includes determining at least one of (a) a number of open and close cycles of the valve, (b) a first duration of time that the valve remained open, (c) a second duration of time that the valve remained closed, (d) an open-to-closed time of the valve, or (e) a closed-to-open time of the valve.

Example 7 includes the method of Example 1, further including providing a diagnostic to an operator.

Example 8 includes an apparatus including a power selection controller to evaluate a first power source to determine if the first power source is available, evaluate a second power source to determine if the second power source is available, upon determining that a power source of the first and second power sources is available, select the power source, a power output to provide power from the selected power source to a sensor, and a diagnostic controller to perform a diagnostic task based on an input from the sensor.

Example 9 includes the apparatus of Example 8, where at least one of the first and second power sources is a 4-20 milliamp signal for a valve.

Example 10 includes the apparatus of Example 8, where at least one of the first and second power sources is an output of a limit switch.

Example 11 includes the apparatus of Example 10, where the output of the limit switch is a discrete signal.

Example 12 includes the apparatus of Example 8, where the sensor is to determine a position of a valve.

Example 13 includes the apparatus of Example 12, wherein the diagnostic controller further includes at least one of (a) a cycle counter to determine a number of open and close cycles of the valve, (b) a position time determiner to determine at least one of a first duration of time that the valve remained open or a second duration of time that the valve remained closed, or (c) a valve speed determiner to determine at least one of an open-to-closed time of the valve or a closed-to-open time of the valve.

Example 14 includes the apparatus of Example 8, further including a communications interface to provide a diagnostic to an operator.

Example 15 includes a non-transitory computer readable medium including instructions which, when executed, cause a machine to evaluate a first power source to determine if the first power source is available, upon determining that the first power source is not available, evaluate a second power source to determine if the second power source is available, upon determining that a power source of the first and second power sources is available, select the power source, provide power from the selected power source to a sensor, and perform a diagnostic task based on an input from the sensor.

Example 16 includes the non-transitory computer readable medium of Example 15, where evaluating the first power source to determine if the first power source is available includes determining if a first current exceeds a first current threshold, wherein evaluating the second power source to determine if the second power source is available includes determining if a second current exceeds a second current threshold, and wherein the machine draws less than 1 milliamp of current from the selected power source.

Example 17 includes the non-transitory computer readable medium of Example 15, where the sensor is a hall effect sensor to determine a position of a valve.

Example 18 includes the non-transitory computer readable medium of Example 15, where a first one of the first and second power sources is a first output of a first limit switch to detect that a valve is in an open position, and a second one of the first and second power sources is a second output of a second limit switch to detect that the valve is in a closed position.

Example 19 includes the non-transitory computer readable medium of Example 15, where the instructions, when executed, further cause the machine to provide power to at least one of (a) a user interface or (b) a radio-frequency transceiver.

Example 20 includes the non-transitory computer readable medium of Example 15, where the first and second power sources are outputs of limit switches for a pneumatically actuated valve.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A method for performing a diagnostic task, including:
   evaluating a first power source to determine if the first power source is available, the first power source corresponding to a first output of a first limit switch, the first limit switch to detect that a valve is in an open position;
   evaluating a second power source to determine if the second power source is available, the second power source corresponding to a second output of a second limit switch, the second limit switch to detect that the valve is in a closed position;
   upon determining that a power source of the first and second power sources is available, selecting the power source;
   providing power from the selected power source to a sensor; and
   performing the diagnostic task based on an input from the sensor.

2. The method of claim 1, wherein evaluating the first and second power sources includes determining if the power source of the first and second power sources exceeds a current threshold.

3. The method of claim 1, wherein the sensor is to determine a position of the valve.

4. The method of claim 3, wherein performing the diagnostic task based on the input includes determining at least one of (a) a number of open and close cycles of the valve, (b) a first duration of time that the valve remained open, (c) a second duration of time that the valve remained closed, (d) an open-to-closed time of the valve, or (e) a closed-to-open time of the valve.

5. The method of claim 1, further including providing a diagnostic to an operator.

6. An apparatus including:
   a power selection controller to:
      evaluate a first power source to determine if the first power source is available, the first power source corresponding to a first output of a first limit switch, the first limit switch to detect that a valve is in an open position;
      evaluate a second power source to determine if the second power source is available, the second power source corresponding to a second output of a second limit switch, the second limit switch to detect that the valve is in a closed position; and
      upon determining that a power source of the first and second power sources is available, select the power source;
   a power output to provide power from the selected power source to a sensor; and
   a diagnostic controller to perform a diagnostic task based on an input from the sensor.

7. The apparatus of claim 6, wherein at least one of the first output of the first limit switch or the second output of the second limit switch is a discrete signal.

8. The apparatus of claim 6, wherein the sensor is to determine a position of the valve.

9. The apparatus of claim 8, wherein the diagnostic controller further includes at least one of:
   (a) a cycle counter to determine a number of open and close cycles of the valve,
   (b) a position time determiner to determine at least one of a first duration of time that the valve remained open or a second duration of time that the valve remained closed, or
   (c) a valve speed determiner to determine at least one of an open-to-closed time of the valve or a closed-to-open time of the valve.

10. The apparatus of claim 6, further including a communication interface to provide a diagnostic to an operator.

11. A non-transitory computer readable medium comprising instructions which, when executed, cause a machine to:
   evaluate a first power source to determine if the first power source is available the first power source corresponding to a first output of a first limit switch, the first limit switch to detect that a valve is in an open position;
   upon determining that the first power source is not available, evaluate a second power source to determine if the second power source is available, the second power source corresponding to a second output of a second limit switch, the second limit switch to detect that the valve is in a closed position;

upon determining that a power source of the first and second power sources is available, select the power source;

provide power from the selected power source to a sensor; and perform a diagnostic task based on an input from the sensor.

12. The non-transitory computer readable medium of claim 11, wherein evaluating the first power source to determine if the first power source is available includes determining if a first current exceeds a first current threshold, wherein evaluating the second power source to determine if the second power source is available includes determining if a second current exceeds a second current threshold, and wherein the machine draws less than 1 milliamp of current from the selected power source.

13. The non-transitory computer readable medium of claim 11, wherein the sensor is a hall effect sensor to determine a position of the valve.

14. The non-transitory computer readable medium of claim 11, wherein the instructions, when executed, further cause the machine to provide power to at least one of (a) a user interface or (b) a radio-frequency transceiver.

15. The non-transitory computer readable medium of claim 11, wherein the valve is a pneumatically actuated valve.

* * * * *

UNITED STATES PATENT AND TRADEMARK OFFICE
CERTIFICATE OF CORRECTION

| | | |
|---|---|---|
| PATENT NO. | : 12,031,640 B2 | Page 1 of 1 |
| APPLICATION NO. | : 17/184091 | |
| DATED | : July 9, 2024 | |
| INVENTOR(S) | : Jensen et al. | |

It is certified that error appears in the above-identified patent and that said Letters Patent is hereby corrected as shown below:

In the Claims

In Column 20, Claim 11, Line 61, insert -- , --.

Signed and Sealed this
Third Day of September, 2024

*Katherine Kelly Vidal*

Katherine Kelly Vidal
*Director of the United States Patent and Trademark Office*